(12) United States Patent
Bahn

(10) Patent No.: US 8,170,119 B2
(45) Date of Patent: May 1, 2012

(54) APPARATUS AND METHOD FOR PLAYING CONTENT BASED ON THE LAST-WATCHED-POINT OF SERIES CONTENT

(75) Inventor: Duk-hoon Bahn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1513 days.

(21) Appl. No.: 11/651,595

(22) Filed: Jan. 10, 2007

(65) Prior Publication Data

US 2007/0248317 A1    Oct. 25, 2007

(30) Foreign Application Priority Data

Apr. 5, 2006    (KR) .................. 10-2006-0031156

(51) Int. Cl.
   *H04N 5/76*    (2006.01)
(52) U.S. Cl. ................ 375/240.26; 386/297; 725/53
(58) Field of Classification Search ............ 386/297
    See application file for complete search history.

(56) References Cited

U.S. PATENT DOCUMENTS

| | | | | |
|---|---|---|---|---|
| 7,260,311 | B2 * | 8/2007 | Okujima et al. ............ | 386/201 |
| 2003/0237093 | A1 * | 12/2003 | Marsh ............................ | 725/46 |
| 2004/0120694 | A1 * | 6/2004 | Hamada et al. ............... | 386/95 |
| 2004/0189690 | A1 * | 9/2004 | Poslinski et al. ............. | 345/719 |
| 2005/0185557 | A1 | 8/2005 | Inakura | |
| 2006/0236353 | A1 * | 10/2006 | Cheng et al. .................... | 725/90 |
| 2007/0122108 | A1 * | 5/2007 | Bontempi ....................... | 386/83 |
| 2011/0126246 | A1 * | 5/2011 | Thomas et al. ................ | 725/93 |

FOREIGN PATENT DOCUMENTS

| | | |
|---|---|---|
| CN | 1658321 A | 8/2005 |
| JP | 2000-138886 A | 5/2000 |
| JP | 3088368 U | 6/2002 |
| JP | 2005-310195 A | 11/2005 |
| KR | 10-2000-0034750 A | 6/2000 |
| KR | 10-353176 B1 | 9/2002 |
| WO | WO 99/38169 A1 | 7/1999 |

\* cited by examiner

*Primary Examiner* — Matthew Smithers

(74) *Attorney, Agent, or Firm* — Sughrue Mion, PLLC

(57) ABSTRACT

An apparatus and method are provided for playing content by searching for information on the last-watched-point with respect to the content that a user watched previously, with only a selection of a file name of selected content when playing series content. The apparatus includes an information-extracting unit which extracts a series title and a program title with respect to specific content based on an electronic program guide of the series content, a control unit which generates a file name based on the extracted series title and program title, an item-generating unit which generates a content item based on the extracted series title and program title, and the generated file name, and a retrieval unit which, if the specific content is to be played, extracts a last-watched-point value by searching for information on a play point corresponding to the file name.

12 Claims, 7 Drawing Sheets

APPARATUS AND METHOD FOR PLAYING CONTENT BASED ON THE LAST-WATCHED-POINT OF SERIES CONTENT

CROSS-REFERENCE TO RELATED PATENT APPLICATIONS

This application is based on and claims priority from Korean Patent Application No. 10-2006-0031156 filed on Apr. 5, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to playing content based on a last-watched-point of series content and, more particularly, to playing content by searching for information on a last-watched-point with respect to content that a user watched previously, by only searching with the selection of file name of an optional content when playing series content.

2. Description of the Related Art

With the introduction of personal video recorders (PVRs) and digital video recorders (DVRs) in the era of digital broadcasting, it is possible to watch a program at any time by storing it in digital form.

Many recording devices provide a reservation-recording function of an entire series (set of episodes) linked to an electronic program guide (EPG) service. Therefore, a user can record a series more easily.

Selection of a portion of a video, stored on the recording device (such as a PVR or a DVR), for viewing is performed by the user.

For example, if a user has recorded series content including a number of episodes, the user would want to watch the recorded material from the position where the user stopped watching.

In order to do this, the user may need to proceed through a series of selections in order to find and select the corresponding content within the recorded material. In addition, it is often inconvenient to have to find a desired portion of a recording via a predetermined movement, such as fast-forward or rewind.

Devices which provide a bookmark function have been made to solve these problems. However, the bookmark function could only be applied with respect to one file.

Korean Unexamined Patent Publication No. 2001-0034279 discloses an information reproduction system, an information recording system, and a recording medium used with the system. Control information is stored in a data area of the information recording medium. A to-be-reproduced video object is also stored on the information recording medium. The control information includes playback interrupt information for resuming playback, and an area of the information recording medium is provided for this process. This makes it possible to reproduce a picture corresponding to a specific portion of the content when playback has been interrupted, by referring to the playback interrupt information. The device then reproduces the content from a last watched position when the same disc is re-inserted therein by using the reproduction information. However, technology for reproducing the content from the last watched position by selecting an optional file form among a series of files stored as a series unit is not disclosed.

SUMMARY OF THE INVENTION

The present invention provides an apparatus and method which play content from a last watched position based on a last-watched-point when a user requests to play content, by storing the last last-watched-point.

The present invention also provides an apparatus and method which play content that a user previously watched though he or she selected an optional content (that is, a file name) from among a plurality of content (or files) stored as a series.

According to an aspect of the present invention, there is provided an apparatus for playing content based on a last-watched-point of the series content, the apparatus including an information-extracting unit which extracts a series title and a program title with respect to specific content based on an electronic program guide (EPG) of the series content, a control unit which generates a file name based on the extracted series title and program title, an item-generating unit which a content item based on the extracted series title and program title, and the generated file name, and a retrieval unit which, if the specific content is to be played, extracts last-watched-point value by searching for information on a play point corresponding to the file name.

According to another aspect of the present invention, there is provided a method for playing content based on a watch point of the series content, the method comprising: extracting a series title and a program title with respect to specific content based on an EPG of the series content, generating an item based on the extracted series title and program title, and the generated file name, requesting play of specific content by using the file name, searching for a last-watched-point value based on the file name, and playing the requested specific content based on the last-watched-point value.

BRIEF DESCRIPTION OF THE DRAWINGS

The above and other aspects of the present invention will become apparent by the following detailed description of exemplary embodiments thereof with reference to the attached drawings in which.

DETAILED DESCRIPTION OF EXEMPLARY EMBODIMENTS OF THE INVENTION

Figure 1:
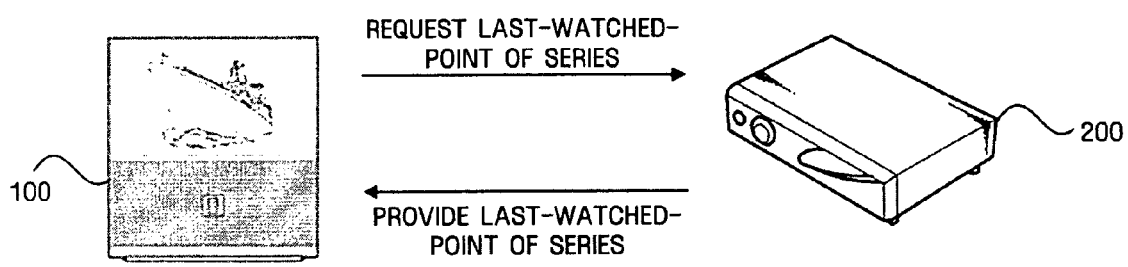
FIG. 1 illustrates a system including an apparatus for playing content based on a last-watched-point of series content according to an exemplary embodiment of the present invention.

Advantages and features of the aspects of the present invention and methods of accomplishing the same may be understood more readily with reference to the following detailed description of exemplary embodiments add the accompanying drawings. The aspects of the present invention may, however, be embodied in many different forms and should not be construed as being limited to the exemplary embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

FIG. 1 illustrates a system including an apparatus for playing content based on a last-watched-point of series content according to an exemplary embodiment of the present invention.

As illustrated, the system includes a display device 100 and a play device 200, for playing content based on the last-watched-point of series content.

The display device 100 displays digital broadcast content on a screen. TV and computer monitors are examples of the display device 100.

The play device 200 records digital broadcast content (hereinafter, referred to as "content") in a nonvolatile memory and plays the recorded content via the display unit 100. The play device 200 may be a PVR or a DVR.

The play device 200 extracts information relating to a series or episode title and to a program title based on the EPG, and determines if the content to be recorded is a series.

Next, a series item and a file name and series title item are generated based on the extracted information (for example, a series title and a program title). If a user selects specific content using a file name (or, a series title), the content is played from the position previously watched by the user by searching for the last-watched-point with respect to the selected content. Though the user can select content to view from among sets of series content, a last-watched-point of the user with respect to the previously watched, selects content is found and played.

For example, if a user selects specific content (for example, episode 3 of "LOST"), the last-watched-point of that specific content (the last-watched point of episode 3 of "LOST") is searched, and play starts from that position.

The play device 200 determines the last-watched-point of a user automatically at certain time intervals, and updates the modified last-watched-point value. The play device 200 will be described as follows, with reference to FIG. 2.

The play device 200 can be implemented as a single system in the display device 100, or as a logically or physically separate independent device.

Figure 2:
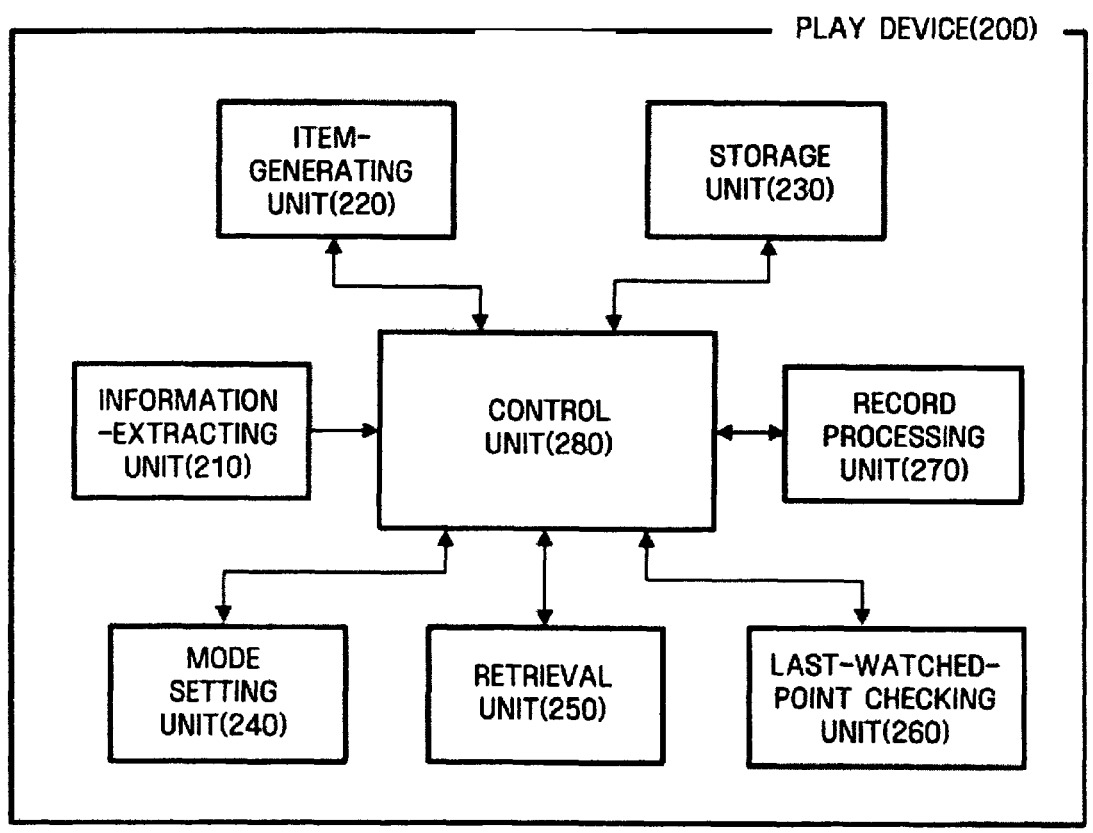
FIG. 2 is a block diagram of the apparatus for playing content based on the last-watched-point of series content according to another exemplary embodiment of the present invention.

FIG. 2 is a block diagram of the apparatus for playing content based on the last-watched-point of series content according to another exemplary embodiment of the present invention.

As illustrated, the play device 200 includes an information-extracting unit 210, an item-generating unit 220, a storage unit 230, a mode setting unit 240, a retrieval unit 250, a last-watched-point checking unit 260, a record-processing unit 270, and a control unit 280.

The term "unit", used in these exemplary embodiments, means, but is not limited to, a software or hardware component, such as a Field Programmable Gate Array (FPGA) or an Application Specific Integrated Circuit (ASIC), which performs certain tasks. A "unit" may advantageously be configured to reside on the addressable storage medium and to be executed by one or more processors. Thus, a "unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "units" may be combined into fewer components or "units" or may be further separated into additional components, "units," and/or modules.

The information-extracting unit 210 extracts the information related to the series or episode title or program title based on an EPG. The information-extracting unit 210 may also extract other information related to the content (for example, series information showing how the series was produced and the total play time of the content thereof).

The item-generating unit 220 generates a series item and a file name and series title item based on the information about the series title and program title extracted by the information-extracting unit 210 and based on the file name generated by the control unit 280. The series title refers to the representative title indicating the series content, and the program title refers to the respective content included in the series. The file name refers to a name under which the content is stored. In the present invention, a user requests that specific content be played by using a file name or a series title.

For example, "LOST" is a program title and "Episode 01" is a series title. The name "episode 01.avi" is a file name for the specific content.

The series item includes a series title, a last-played point, and a program list, and the file name and series title items each include a file name and a series title.

The storage unit 230 stores series items, and file name and series title items generated by the item-generating unit 220. The storage unit 230 stores the EPG and the other extracted information. When a plurality of series items, and file name and series title items exist in the storage unit 230, they may be arranged into one list.

For example, when five series items exist in the play device 200, the respective series items are managed into one series list. That is, the series list includes a series 1 item, series 2 item, series 3 item, series 4 item, and series 5 item.

The mode setting unit 240 sets a mode to play specific content in the play device 200. Here, the play mode is a series play mode or a general play mode.

For example, in the case of the series play mode, the content is played from the position that a user stopped watching by searching for the last-watched-point of the content previously watched by a user based on the file name selected by the user. In the case of the general play mode, the content is played from the beginning with respect to the file name selected by the user.

The retrieval unit 250 searches for the last-played point corresponding to the file name when a user selects a file name, determines the last-watched-point in the searched play point, and extracts the last-played-position value of the content of the file name selected by the user.

For example, when a user selects a file, the retrieval unit 250 searches for a series title corresponding to the selected file. Next, a series item with respect to the series title is searched, and then the last-watched-point value is extracted from the last-played point of the series item.

The last-watched-point checking unit 260 determines the last-watched-point of the content watched by a user at predetermined time periods, and updates the modified last-watched-point value. The updated last-watched-point is stored in the storage unit 230.

The last-watched-point checking unit 260 determines whether the corresponding content is completed by comparing the total play time included in the play point information and the checked last-watched-point, and transmits the result of the determination to the control unit 280. Here, if the last-watched-point value and the total play time are identical, the corresponding content is determined to be completed.

The record-processing unit 270 records specific content selected by a user. Here, the record-processing unit 270 performs recording differently depending on whether the corresponding content is a series.

For example, if the content to be recorded is a series, the record-processing unit 270 determines whether the corresponding content is first recorded. As a result of the determination, if it is the content first to be recorded, the last-played point information of the content is initialized.

If it is not the content first to be recorded, program title and filename items stored in the storage unit 230 are set, and a program title and a temporal order of file name items of the content to be currently recorded are set. The temporal order of program title and file name items is determined based on numbers included in the program title or the date when specific content is recorded.

For example, if the program titles are "Episode 01," "Episode 02," and "Episode 03," the temporal order is set based on the number (for example, 01, 02, and 03) included in the program title. If the program title does not include a number, the temporal order is set based on the dates (for example, March 3, March 10, and March 17) when the corresponding content was recorded.

When the information on the series title and the program title is extracted by the information-extracting unit 210, a file name is generated under which the content from which the information has been extracted is stored. The file name is generated according to the regulation made by the play device 200.

The control unit 280 initializes the last-played point when recording the series content.

For example, in case of a series to be recorded first, the method of initializing includes: connecting a program link included in the last-played point of a series item to the program title and file name items generated by the item-generating unit 220, setting the last-watched-point value as 0, and setting the total play time as the play time value of the corresponding content extracted from the EPG.

The control unit 280 controls the operation of the respective functional blocks (210 to 270) included in the play device 200.

Figure 3A:
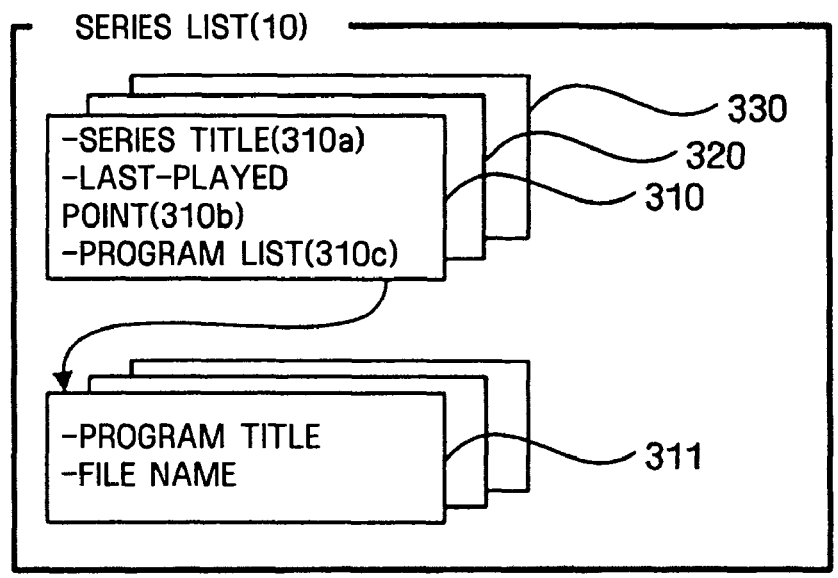
FIGS. 3A and 3B illustrate a configuration of an item generated by an apparatus for playing content based on the last-watched-point of series content according to another exemplary embodiment of the present invention.
Figure 3A:
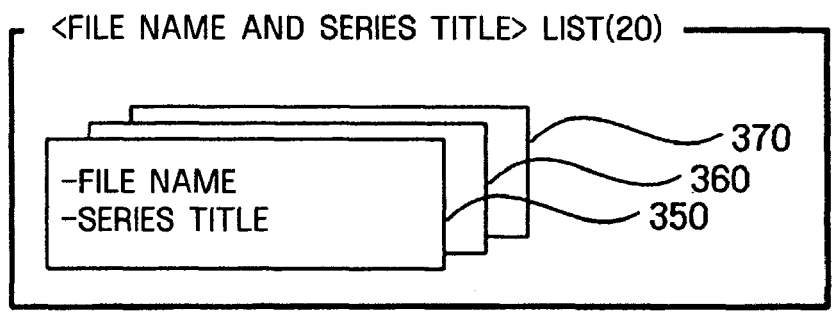
Figure 3B:
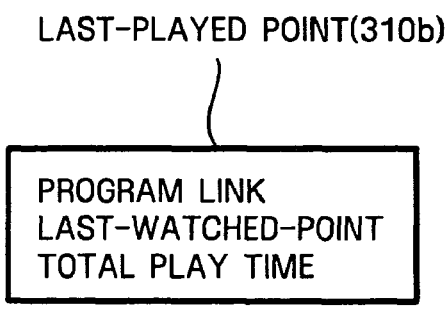

FIGS. 3A and 3B illustrate a configuration of an item generated by an apparatus for playing content based on the last-watched-point of series content according to another exemplary embodiment of the present invention.

As illustrated in FIG. 3A, the item-generating unit 220 generates the information on series title and program title extracted from the information-extracting unit 210, and series items 310, 320, 330, and file name and series title items 350, 360, 370 based on the file name generated by the generating unit 280. The plurality of series items 310, 320 and 330 are included in a series list 10, and the plurality of file name and series title items are included in a file name and series title list 20.

The series item 310 includes a series title 310*a*, a play point 310*b*, and a program list 310C. The play point 310*b* includes a program link, a last-watched-point, and a total play time, as illustrated in FIG. 3B.

The program list 310C has an item 311 including the information on program title and a file name.

A file name and series title item 350 includes the information on a file name and a series title.

Therefore, if a user requests specific content to be played by using a file name, the retrieval unit 250 searches for the last-watched-point of the content selected by using the file name and series title item 350 and the series items 310, 320, and 330, and then plays the content from the position where the user previously stopped watching based on the last-watched-point.

Figure 4:
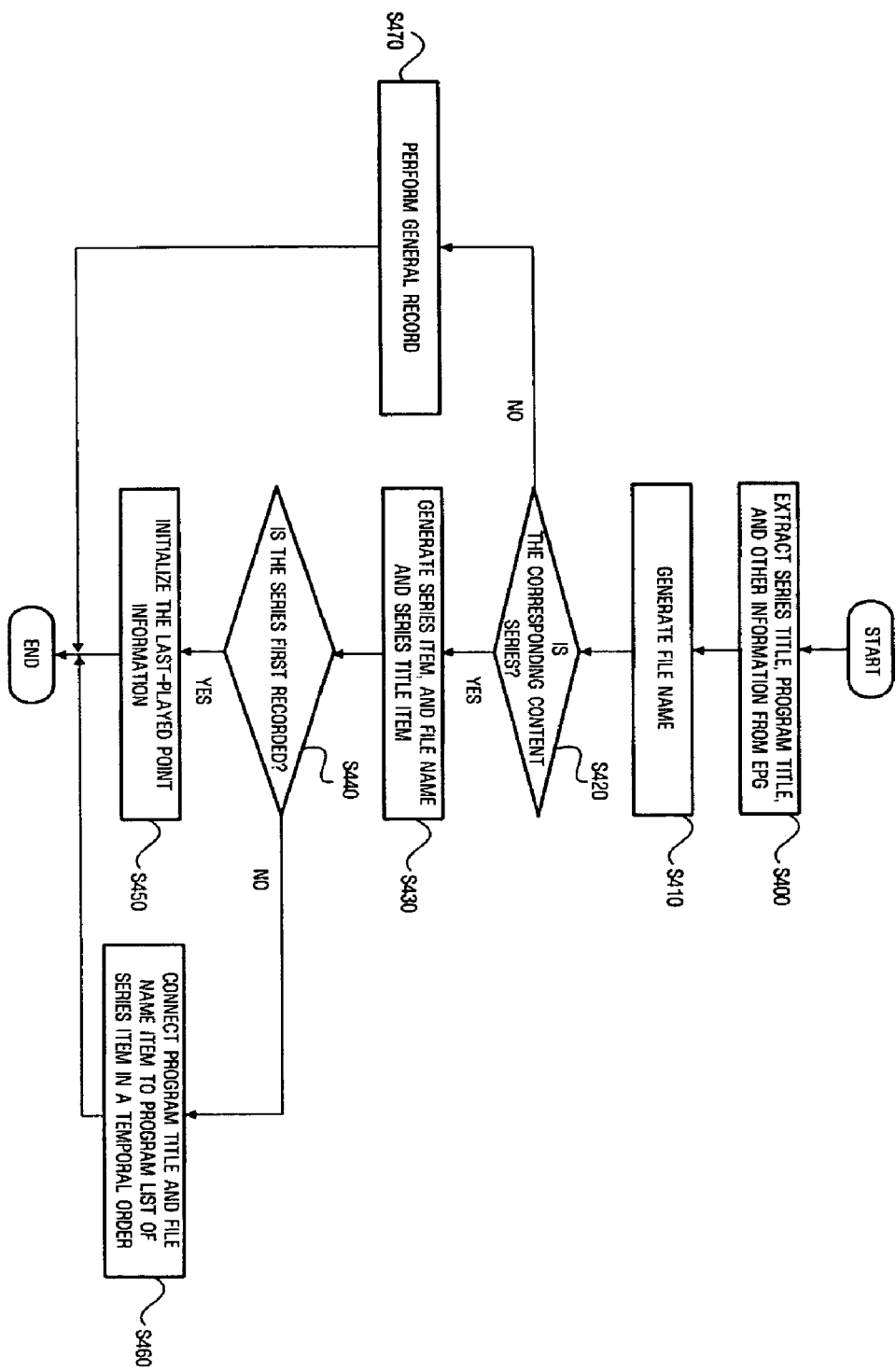
FIG. 4 is a flowchart illustrating generation and initialization of an item for sequentially playing series files, based on a last-watched-point of series content according to another exemplary embodiment of the present invention.

FIG. 4 is a flowchart illustrating a generation and initialization of an item for sequentially playing series files among the methods of playing content based on the last-watched-point of series content according to another specific embodiment of the present invention.

The information-extracting unit 210 extracts series title, program title, and other information with respect to specific content from the EPG (S400). "Other information" indicates series information which may includes how the series was produced, and a total play time of the corresponding content.

The control unit 280 generates the name of the file used to store the corresponding content when the information on series title and program title is extracted by the information-extracting unit 210 (S410). The file name is determined according to the regulation made by the play device 200.

Then, the control unit 280 determines if the corresponding content is a series (S420). As a result of the determination, whether the corresponding content is a series, the control unit 280 requests the item-generating unit 220 to generate file name and a series title item. Here, it can be determined by the series information extracted from the EPG whether the corresponding content is a series or not.

For this, the item-generating unit 220 generates a series item, and a file name and series title item based on the extracted information (S430). The program title and file name item is included in the series item.

The control unit 280 determines if the recorded content is content of the first recorded series (S440). The method of determining whether the recorded content is content of the first recorded series can be obtained by searching for the series item stored in the storage unit 230 based on series title information of the content to be recorded by the retrieval unit 250.

As a result of the determination, if the content is content to be recorded first, the control unit 280 initializes last-played-point information 310*b* of the corresponding content (S450).

For example, the method of initializing may include: connecting a program link included in the last-played-point information 310*b* of the series item 310 generated by the item-generating unit 220 to the program title and file name item, setting the last-watched-point value as 0, and setting the total play time as the total play time value of the corresponding content extracted from the EPG.

If the recorded content is not content to be recorded first, the corresponding series item 310 is searched based on the series title of the corresponding content, and the program title and file name item of the corresponding content are linked to the program list 310C of the searched series item 310 in a temporal order (S460).

For example, if content has already been recorded with a similar series title, the program title and file name item of the currently recorded content is linked to the program list 310C of the corresponding series item to be located at the last temporal order.

As a result of the determination, if the corresponding content is not a series (S420), the record-processing unit 270 performs a general record with respect to the corresponding content.

Figure 5:
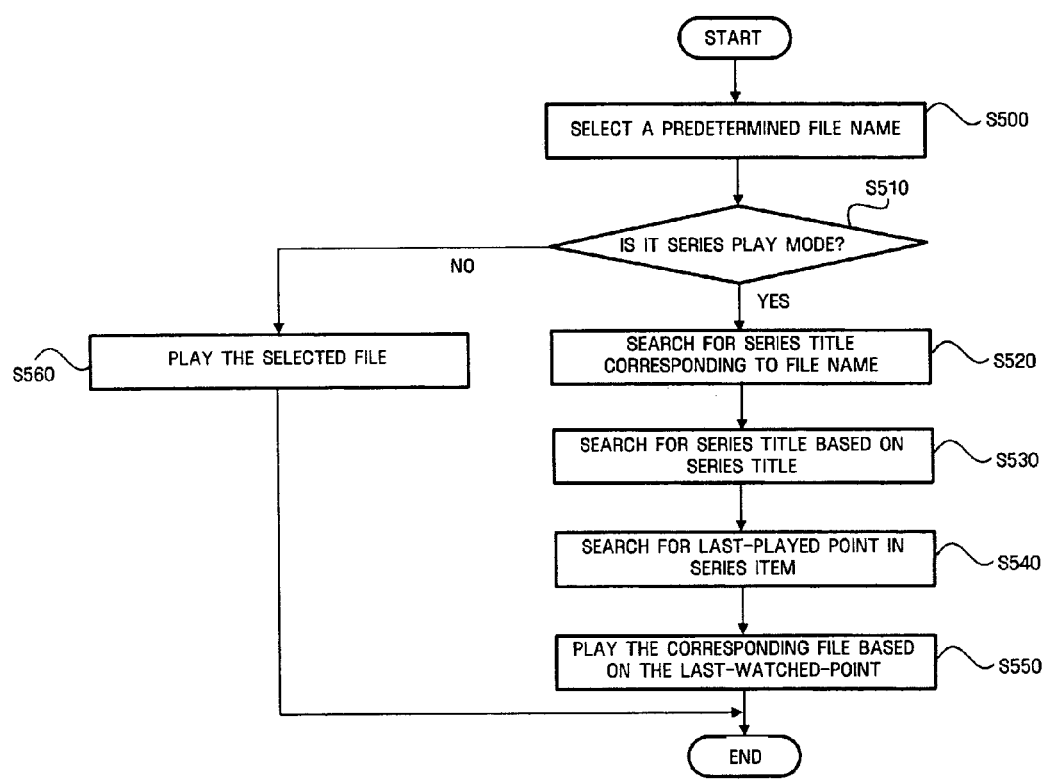
FIG. 5 is a flowchart illustrating a process of sequentially playing series files, based on a last-watched-point of series content according to another exemplary embodiment of the present invention.

FIG. 5 is a flowchart illustrating a process of sequentially playing series files among the methods of playing content based on the last-watched-point of series content according to another exemplary embodiment of the present invention.

First, when a user selects a specific file that he or she wants to watch (S500), the control unit 280 checks a play mode of the current play device 200. If the current play mode is a series play mode, the control unit 280 requests the retrieval unit 250 to search for the last-played point information.

For this, the retrieval unit 250 searches for the series title corresponding to the file name selected by a user (S520). The series title can be searched for using a file name and series title list stored in the storage unit 230.

The corresponding series item is searched in a series list stored in the storage unit 250 based on the searched series title (S530). The program link information and the last-watched-point are extracted from the last-played point information in the searched series item (S540).

The content is played from the position that the user previously stopped watching by extracting the content file to be currently played and the play position value of the content based on the extracted program link and the last-watched-point information (S550).

If the current play mode is a general play mode, the control unit 280 plays the content with respect to the file name selected by the user from the beginning (S560).

Therefore, when a user selects a series play mode, a user can find the wanted content and play location quickly without searching for the previously watched content and its play position, by searching and playing the last-watched-point of the previously watched series content.

Figure 6:
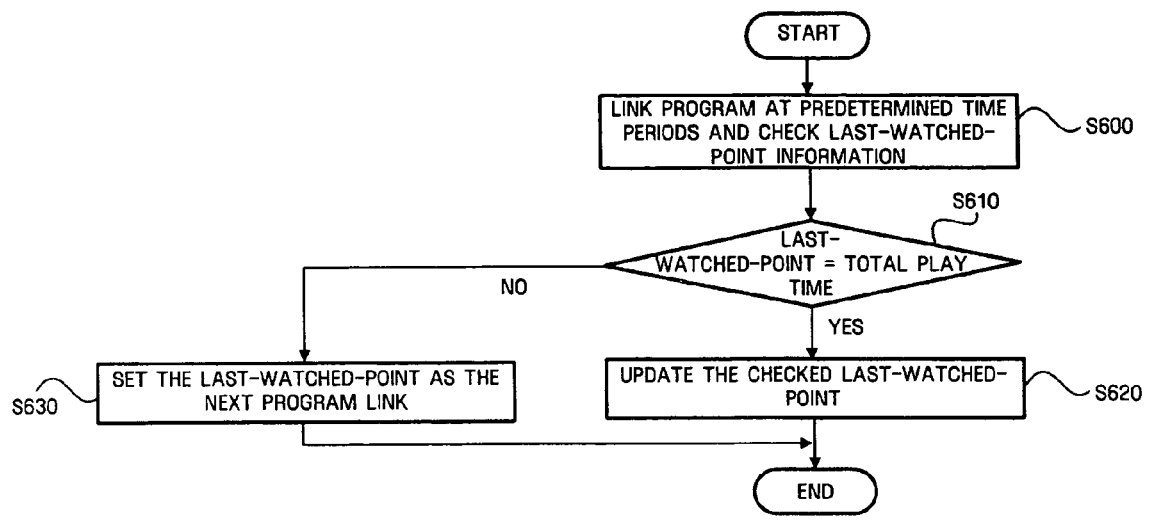
FIG. 6 is a flowchart illustrating a process of checking a last-watched-point based on the last-watched-point of series content according to another exemplary embodiment of the present invention.

FIG. 6 is a flowchart illustrating a process of checking the last-watched-point among the methods of playing content based on the last-watched-point of series content according to another exemplary embodiment of the present invention.

The last-watched-point checking unit 260 checks program link information and last-watched-point information at predetermined time periods (S600). The timing at which the program link information is checked and the last-watched-point information is checked can be optionally modified and set by the control unit 280 and a user.

The last-watched-point checking unit 260 compares a total play time of the checked last-watched-point and the corresponding content. As a result of the comparison, if the last-watched-point value and the total play time are identical (S610), it is determined that the play of the corresponding content has been completed, and the last-watched-point is set as the next program link (S620).

For example, if the last-watched-point and total play time of "episode 01" are identical, the viewing of "episode 01" is considered to be completed, and the last-watched-point is set as the last-played point of "episode 02". For this, the program link of the last-played point is changed to "episode 02", and the total play time is changed to the play time value of the corresponding content (that is, "episode 02") extracted from the EPG.

If the last-watched-point and total play time are not identical as a result of the comparison (S610), the last-watched-point checking unit 260 transmits the checked last-watched-point value to the storage unit 230, and the last-watched-point of the content currently playing is updated and stored therein (S630).

Figure 7:
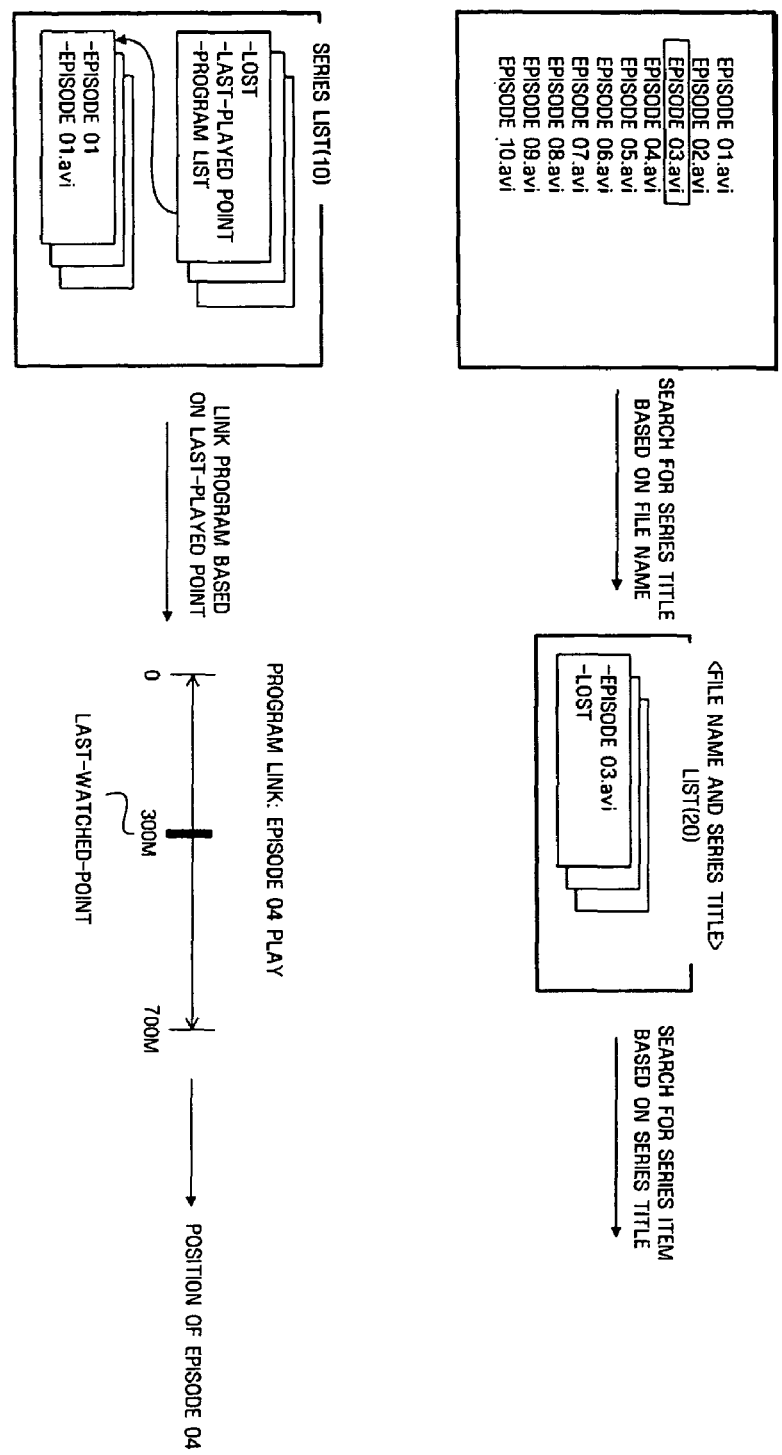
FIG. 7 illustrates playing content based on a last-watched-point of series content according to another exemplary embodiment of the present invention.

FIG. 7 illustrates play of content based on the last-watched-point of series content according to another exemplary embodiment of the present invention. The user is assumed to want to watch a "LOST" series (that is, a series title) again from the position at which the user previously stopped watching.

As illustrated, if the file names (for example, "episode 01" to "episode 10") of the "LOST" content recorded in the display device 100 are displayed, the user selects a specific file name (for example, "episode 03").

For this, the retrieval unit 250 searches for the series title (for example, "LOST") corresponding to the file name selected by the user in the file name and series title list 20. Then, the corresponding series item is searched for in a series list 10 based on the searched series title.

The program link and the last-watched-point are checked in the play point included in the searched series item.

As a result of the check, the current program link is determined to be "episode 04", and the "last-watched-point" is determined to be 300M.

The control unit 280 controls the "episode 04" file to be played from the position corresponding to 300M.

Therefore, even if a user cannot remember the position at which he or she stopped watching the "LOST" TV series, he or she can watch the series content more comfortably by searching for the last-watched-point value with respect to the content that he or she stopped watching and playing the content from the corresponding position, with a selection of an optional file name among the displayed file names.

As described above, the apparatus and the method for playing content based on the last-watched-point of the series content provide one or more of the following effects.

The present invention makes it possible to play content from a last watched position, based on a last-watched-point, when a user requests the playing of content, by storing the last-watched-point with respect to the content (or file) that a user watched. Therefore, the user can automatically watch the content from the position that he or she stopped watching by selecting optional content (that is, a file name) included in a series.

In addition, since the present invention stores and manages the information required to play the series content, the user is required to do less operations to play content.

What is claimed is:

1. An apparatus for playing content based on a last-watched-point in a series content, the apparatus comprising:
   an information-extracting unit which extracts a series title and a program title with respect to content based on an electronic program guide of the series content;
   a control unit which generates a file name based on the extracted series title and the extracted program title;
   an item-generating unit which generates an item of the content based on the extracted series title and the extracted program title, and the generated file name; and
   a retrieval unit which, if the content is to be played, extracts a last-watched-point value by searching for information on a play point based on the file name.

2. The apparatus of claim 1 further comprising:
a storage unit which stores the item generated by the item-generating unit and the information extracted by the information-extracting unit;
a mode setting unit which sets a play mode of the content that is requested to be played;
a checking unit which determines a last-watched-point of content, at predetermined time periods, and updates the last-watched-point value; and
a record-processing unit which records the content based on the series information of the content.

3. The apparatus of claim 1, wherein the generated item is a series item and a file name and a series title item.

4. The apparatus of claim 3, wherein the series item comprises at least one of the series title, a last-played point, and a program list.

5. The apparatus of claim 4, wherein the last-played point comprises at least one of a program link, a last-watched-point, and a total play time.

6. The apparatus of claim 4, wherein the series title includes one of a name of the series and a name of an episode of the series.

7. The apparatus of claim 6, wherein the series title includes an episode number.

8. A method of playing content based on a last-watched-point in series content, the method comprising:
extracting a series title and a program title based on an electronic program guide (EPG) of the series content;
generating an item based on the extracted series title and the extracted program title, and a file name;
requesting playing of content using the file name; and
searching for a last-watched-point value based on the file name, and playing the content based on the last-watched-point value.

9. The method of claim 8, further comprising:
after extracting the series title and program title, generating a file name based on the extracted series title and program title.

10. The method of claim 8 wherein searching for the last-watched-point value based on the file name comprises:
searching for a desired series title corresponding to the file name;
searching for a desired series item of corresponding content based on the desired series title; and
extracting the last-watched-point value of the corresponding content based on the last-played point information in the desired series item.

11. The method of claim 8, further comprising:
checking a last-watched-point at predetermined time periods;
comparing the last-watched-point and the total play time;
if the last-watched-point and the total play time are identical as a result of the comparison, setting a current last watched point as a next program link; and
if the last-watched-point and the total play time are not identical, updating the last-watched point value.

12. The method of claim 8, wherein, if playing of specific content using the file name is requested,
searching for the last-watched-point value of the corresponding content with respect to the series.

* * * * *